W. J. HAMPTON.
THREAD CUTTING DEVICE.
APPLICATION FILED DEC. 24, 1917.
1,275,677. Patented Aug. 13, 1918.
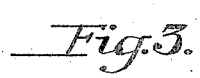
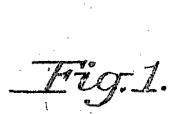
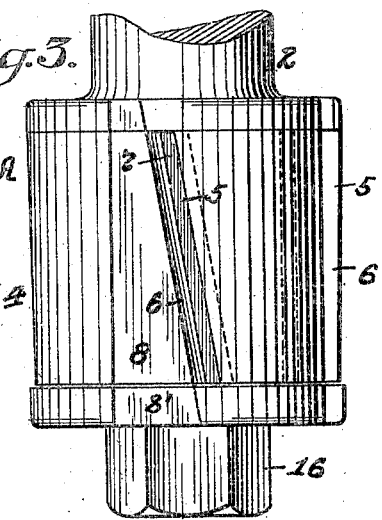
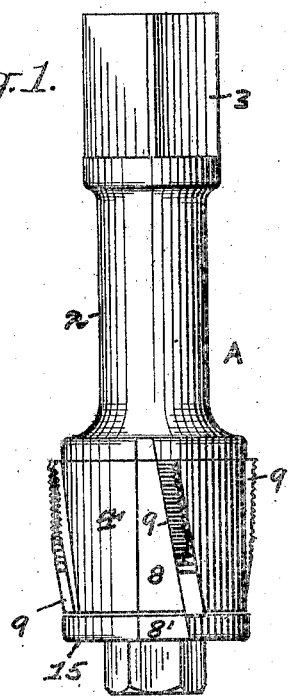
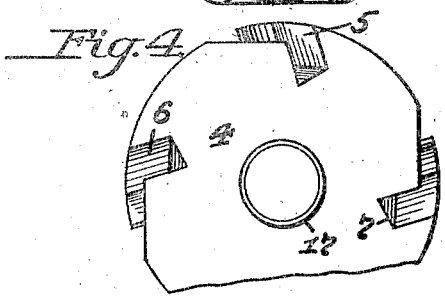
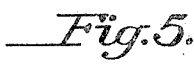
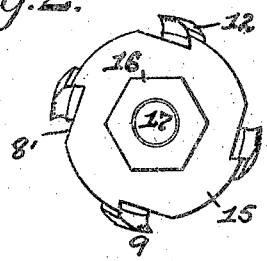
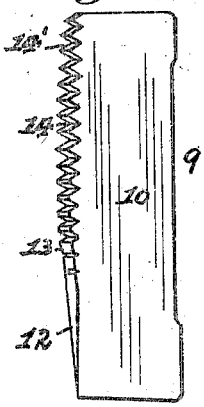
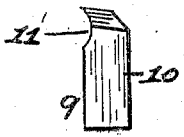
Witnesses:
John E. Jackson
G. M. Geoghegan
Inventor:
William J. Hampton,
By J. N. Cooksey
Attorney.

UNITED STATES PATENT OFFICE.

WILLIAM J. HAMPTON, OF PITTSBURGH, PENNSYLVANIA, ASSIGNOR TO SPANG, CHALFANT AND CO., INCORPORATED, OF PITTSBURGH, PENNSYLVANIA, A CORPORATION OF PENNSYLVANIA.

THREAD-CUTTING DEVICE.

1,275,677. Specification of Letters Patent. Patented Aug. 13, 1918.

Application filed December 24, 1917. Serial No. 208,581.

*To all whom it may concern:*

Be it known that I, WILLIAM J. HAMPTON, a citizen of the United States, and resident of Pittsburgh, in the county of Allegheny and State of Pennsylvania, have invented a new and useful Improvement in Thread-Cutting Devices; and I do hereby declare the following to be a full, clear, and exact description thereof.

This invention relates to thread cutting tools, and has for one of its principal objects the provision of a tool—such as a tap or die—that will not stick or bind, and one that will not clog.

A further object is to provide a tool of this class that will not chip the cuttings, but on the contrary will cause them to curl axially and forwardly from the cutting threads of the tool, while with my improved tool a greater speed may be maintained than with any such tool heretofore constructed because of the lack of sticking and friction, and approximately one-half the power is necessary to drive the same than has been necessary to drive similar tools as heretofore used.

To these ends my invention consists in the combination and construction of parts hereinafter more particularly set forth and claimed, although I wish it expressly understood that while I have shown and described one particular form of my invention, such as a tap, yet I do not desire to be limited to such form, as the same is only illustrative of my invention, and various changes in design and structure may be made within the scope of the appended claims without departing from the spirit of my invention.

To enable others skilled in the art to which my invention appertains to construct and use my improved tool, I will describe the same more fully, referring to the accompanying drawings, in which:

Figure 1 is an elevation of a tap embodying my invention;

Fig. 2 is a front end view of the same;

Fig. 3 is an enlarged elevation of the tool head, with the segments removed;

Fig. 4 is an enlarged front end view showing a portion of the cutting head, with the segments removed; and Figs. 5 and 6 are respectively side and end views of one of the segments.

Like symbols of reference herein indicate like parts in each of the figures of the drawing.

Referring more particularly to the drawing, A designates the body portion of my improved tap as a whole, which comprises a shank portion 2 terminating in a squared portion 3 adapted to be engaged by a chuck or other tool holder and a cylindrical head portion 4. The head portion 4 has a plurality of rectangular slots 5 therein disposed at an angle to its longitudinal axis. Such slots are so directed toward the center of the head that the planes of their sides are parallel with each other and directed away from the radii of such cylindrical head at an angle suitable for the purpose, and the bottom face 7 of said slots is parallel with the axis of said head and perpendicular to the plane of the sides 6.

The surface of the head 4 is cut away as at 8 adjacent one edge of the slots 4 to provide a beveled clearance space. Cutting segments 9 are disposed within each of the slots 4 and comprise a body portion 10 having a concave groove 11 in its one side face adjacent its top to provide the necessary rake, and also to cause the cut shavings to be deflected in a coil-like fashion. The face of each of the segments 9 is provided with a beveled lead portion 12, a cutting thread portion 13 disposed in the rear of the lead portion, a thread forming portion 14 disposed in the rear of the cutting threads, and a reserve thread portion 14' in the rear of the forming threads. The segments 9 have the portions 11 and 12 of their upper face ground on a downwardly and rearwardly extending angle so as to facilitate the cutting action thereof. The body portion 10 of the segments 9 is squared so that when such segments are placed within the slots 5 they will be disposed at an angle to the longitudinal axis of the head, and also extend in the direction of travel of the tap at the angle desired to the radii of the head 4.

The segments 9 are held in the slots 5 by a removable disk member 15 held in place by the nut 16 which is screwed on the projection 17 extending from the center portion of the bottom face of the head, and such disk has a recess 8' for registering with the space 8 in the head 4. Of course it will be understood that other securing means may be used if desired.

When tapping articles with my improved tool, the material will be cut clean and in relatively long cuttings. The cuttings will be coiled or turned, due to the angles of the segments 9, and will be also aided in coiling by being deflected inwardly by the concave portion 11, and such coiled cuttings will find their way downward along the beveled clearance spaces formed by cutting away the head, as at 8, and out; while with similar tools heretofore constructed the cuttings have been in the form of chips and such cuttings will pack in the threads until the tool becomes stuck and broken.

It will be seen that with the arrangement of the angles of the segments, means are provided for changing the direction of the cuttings leaving the work free of the tool, and thereby avoiding subsequent clogging of the tool and spoiling both the work and tool. Such arrangement will also give the tool additional rake for the cutting of the metal in the work, which will allow the cuttings to leave the work more smoothly and with less friction, thereby resulting in a smoother surface in the finished work, and the tool will be cleaner by not having small chips around and in the same.

I have described and shown my invention as applied to a tap, but it will be evident that the same principle may be applied to dies, and other similar thread cutting devices.

Having thus described my invention, what I claim and desire to secure by Letters Patent is:

1. A thread cutting tool comprising a member having a cylindrical head, a plurality of removable land segments mounted in said head at an angle to the longitudinal axis thereof and extending in the direction of travel of said member on an angle to the radii thereof, said head being provided with beveled clearance portions on one side of each of said segments, and means for securing said lands in position.

2. A thread cutting tool comprising a member having a cylindrical head portion, a plurality of removable segments secured to said head portion, each of said segments being disposed at an angle to the longitudinal axis of said head and extending in the direction of travel of said member and at an angle to the radii of said head, clearance spaces formed along one side of each of said segments, and each of said segments having a concave portion formed in its cutting face, and a removable disk adapted for engaging the bottom ends of said segments to secure the same in place, substantially as shown and described.

3. A thread cutting tool comprising a member having cylindrical head, a plurality of removable land segments mounted in said head at an angle to the longitudinal axis thereof and extending in the direction of travel of said member on an angle to the radii thereof, said head being provided with beveled clearance portions on one side of each of said segments, said segments having a side face adjacent said clearance portions undercut, and means for securing said land segments in position.

4. A thread cutting tool comprising a member having a plurality of removable segments each of said segments being disposed at an angle to the longitudinal axis of said member and extending in the direction of travel of said member and at an angle to the radii of said member, said segments having their one face undercut on a curve, each of said segments presenting a lead portion, cutting thread portion and a threading portion, and a removable clamping plate adapted to engage one end of each of said segments to secure the same in position.

In testimony whereof I, the said WILLIAM J. HAMPTON, have hereunto set my hand.

WILLIAM J. HAMPTON.

Witnesses:
J. N. COOPER,
J. M. GEOGHEGAN.

Copies of this patent may be obtained for five cents each, by addressing the "Commissioner of Patents, Washington, D. C."